Patented Nov. 5, 1940

2,220,678

UNITED STATES PATENT OFFICE 2,220,678

SULPHONATION PRODUCTS AND PROCESS OF MANUFACTURE

Jack H. Cromwell, Merchantville, and Sylvan R. Merley, Riverton, N. J., assignors to Power Patents Company, Hillside, N. J., a corporation of Maine No Drawing. Application October 23, 1937, Serial No. 170,600

5 Claims. (Cl. 260—98)

This invention relates to improved organic compounds adapted to lower the surface tension of liquids and to the process of their manufacture. The invention is particularly directed to improvements in sulphonated organic compounds adapted to be used as wetting agents, foaming agents, and for other various uses which will be apparent to those skilled in the art.

Various sulphonating agents have been employed in the manufacture of sulphonated organic compounds such for example as the agents referred to in Patents No. 2,061,617 to 20. These patents also recite in substantial detail the various uses to which sulphonated organic compounds are placed, more particularly compounds having relatively high molecular weights, that is, compounds containing eight or more carbon atoms to the molecule. Chlorosulphonic acid appears to have been used as a sulphonating agent for certain organic compounds, whereas sulphuric acid and sulphur trioxide have been used in other instances.

The primary object of the present invention is to provide a process for sulphonating organic compounds and particularly organic compounds of relatively high molecular weight under controlled conditions particularly adapted to prevent side reactions and secure relatively uniform products.

A further object of the invention is to provide an improved sulphonating agent which will avoid certain of the difficulties heretofore encountered in the use of sulphonating agents such as those previously used at the temperatures at which the reactions were carried out.

A further object of the invention is to provide new and improved sulphonic acids of relatively high molecular weight organic compounds and products.

In general the process of the present invention includes the procedural steps of diluting the organic compound to be sulphonated with a solvent such for example as a chlorinated hydrocarbon of the type of carbon tetrachloride, forming a solution of pyrosulfuryl chloride in a substantial proportion of the same solvent as that used for dissolving the organic compound, slowly adding the resulting diluted sulphonating agent to the diluted organic compound and intimately mixing the same therewith while maintaining a relatively low temperature preferably from minus 10 to minus 20 degrees Fahrenheit such as a temperature below approximately minus 15° F. After the addition of the sulphonating agent has been completed and the sulphonating reaction carried out to the desired extent, which usually takes two or more hours, the resulting mixture, which may have been made in a reaction vessel provided with a suitable rotary mixer, is drowned with approximately one half its volume of ice water, and the stirring and mixing is continued to intimately contact the reaction product with the water. After the water treatment has been completed the materials are permitted to separate into different layers, the water layer containing the sulphonic acid product and the carbon tetrachloride layer retaining any unreacted material and substances which are not soluble in water. The layers are separated and the water solution neutralized with a strong sodium hydroxide solution. The neutralized solution of the sulphonic acid resulting from the reaction may then be purified by well-known methods. The sulphonation may be effected by vaporizing the sulphonating agent in a stream of dry air and passing the mixture into the diluted organic compound.

The use of pyrosulphuryl chloride as the sulphonating agent, particularly when chlorinated hydrocarbon solvents are used, avoids the dangerous reaction which occurs between sulphur trioxide and carbon tetrachloride for example, if sufficiently low temperatures are not used. This reaction results in the formation of the very poisonous gas, phosgene. So far as determined, pyrosulphuryl chloride does not react with any of the chlorinated hydrocarbon solvents which are particularly useful in the sulphonation procedure. Furthermore, pyrosulphuryl chloride has not only been found to be a very effective sulphonating agent, but one which is particularly useful at relatively low temperatures and which causes no organic chloride formation as well as a minimum of polymerization of relatively high molecular weight organic compounds at low temperatures.

Other features and advantages of the present invention will appear from the following examples which illustrate the operation of the improved process and the products obtained from the various sulphonation operations.

Example 1

A dipentene having a boiling point of about 177° C. and a specific gravity of about 0.850 was diluted with carbon-tetrachloride equivalent to about six times its volume. The resulting mixture was cooled to a temperature of about minus 10° F. in a reaction vessel provided with a turbo mixer. Pyrosulphuryl chloride, dissolved in about three volumes of carbon tetrachloride, was slowly added to the reaction vessel while the temperature of the mixture therein was substantially maintained and continuous agitation carried out over a period of about two hours.

After the reaction had gone to completion, the mixture in the vessel was drowned with about an equal volume of ice water and the separation of the water soluble sulphonic acid layer was effected in the manner described above. It is the usual practice in these operations to thoroughly wash the carbon tetrachloride layer with water in order to remove any water soluble sulphonic acids. The water layer of the sulphonic acid was neutralized with sodium hydroxide which resulted in the formation of a hydroxy dipentene sodium sulphonate.

This product was purified by evaporation of the water solution to dryness, dissolving of the sulphonate in dry methanol, and filtering, followed by evaporation of the filtrate, to obtain the purified sodium sulphonate. This product which was a yellowish white solid and soluble in water to give a clear solution, was found to also be soluble in oleic acid, glycerine and triethanolamine. It was insoluble in petroleum naphtha, benzene and acetone.

Example 2

A mixture of diamylenes having a tertiary carbon at the double bond in their structure was sulphonated by exactly the same procedure as that used in Example 1. The resulting sodium sulphonate product which was diamylene hydroxy sodium sulphonate was a solid light yellow resinous-like material which was found to be completely soluble in water, the alcohols, carbon tetrachloride, ether, amyl acetate, petroleum naphtha, and acetone.

Example 3

A steam distilled wood turpentine was sulphonated with pyrosulfuryl chloride in the same manner as the material given in Example 1. The turpentine had a specific gravity of about 0.863 and distilled between 150° and 170° C. The sulphonation product obtained in this case was a creamy colored resin-like material found to be soluble in water, the alcohols, glycerine, triethanolamine and oleic acid but insoluble in acetone and petroleum oil.

A similar product was obtained from the sulphonation of a turpentine having a high pinene content. The sodium sulphonate was found to be insoluble in acetone, carbon tetrachloride, amyl acetate, ether, benzene, and petroleum naphtha.

Example 4

The alpha and beta pinenes were sulphonated at a temperature of approximately zero degrees F. by the procedure used in Example 1 with pyrosulphuryl chloride. The alpha-pinene hydroxy sodium sulphonate produced was a buff colored solid, whereas the beta-pinene hydroxy sodium sulphonate was a light brown solid both of resinous character. These products were found to be soluble in about the same solvents except that the alpha sulphonate was soluble in chloroform, whereas the beta sulphonate was not. These products appear to have the following structural formula:

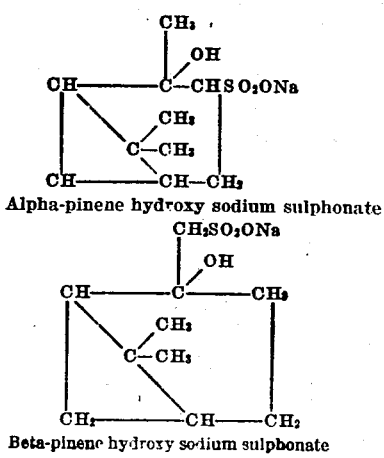

Alpha-pinene hydroxy sodium sulphonate

Beta-pinene hydroxy sodium sulphonate

Example 5

A refined water white steam distilled pine oil was sulphonated with pyrosulphuryl chloride at a temperature of 10° F. under approximately the conditions and procedure used in Example 1. The pine oil used had a specific gravity of about 0.943, a refractive index at 20° C. of 1.480, and 90% of it distilled between about 215° and 225° C.

The sodium sulphonate product produced by the sulphonation of the pine oil was a dark brown resinous solid material completely soluble in water, but insoluble in ether, petroleum naphtha and carbon tetrachloride. The product was found to be soluble in alcohols, glycerene, benzene, chloroform and oleic acid. The active ingredients in pine oil are primarily alcohols, and it appears that the pyrosulphuryl chloride acts to dehydrate or oxidize the alcohol and then form the sulphonate in the various stages of the operation.

Example 6

Commercial abietic acid which is a golden yellow transparent resin was dissolved in about five volumes of carbon tetrachloride and reacted with pyrosulpuryl chloride in dilute solution at a temperature of approximately minus 15° F. The hydroxy sodium sulphonate abietate was a light yellow solid resinous material soluble in alcohols, but insoluble in acetone, carbon tetrachloride, amyl acetate, ether, benzene, chloroform, and petroleum naphtha. The product was water soluble and gave a clear solution.

Abietic acid and some of its derivatives have supposedly been previously sulphonated by other sulphonating agents as shown by Patents No. 2,015,023 and 2,076,563, but it will be noted that the sulphonate product is materially different from that obtained in the above operation which may be represented by the following structural formula:

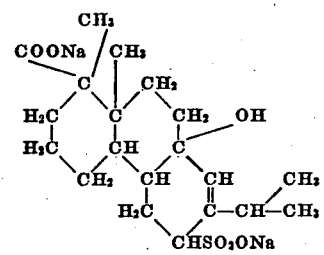

Hydroxy sodium sulphonate-abietate

Methyl abietate was sulphonated with pyrosulphuryl chloride under approximately the same conditions except that a temperature of minus 10 to minus 20° F. was maintained throughout the reaction period. The methyl abietate was sulphonated at the same position as the abietic acid. This product was a light yellow solid having substantially the same solubility characteristics as the sulphonated acid.

Dihydromethyl abietate was also sulphonated at a temperature of about minus 10° F. by the procedure described above in connection with Example 1, and gave a sodium salt which was a light yellow solid having solubility characteristics somewhat different from the abietate products described above. For example, it was found to be partly soluble in acetone and amyl acetate and soluble in benzene and chloroform. All of these products are soluble in water and are not precipitated therefrom by calcium iron. The structure of the dihydrosulphonate is substantially different from that of the sulphonate of the abietic acid and has been found to be substantially as follows:

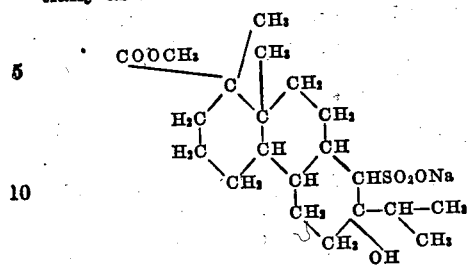

Dihydro (hydroxy sodium sulphonate) methyl abietate

The products produced by the sulphonation reactions described in the foregoing examples are exceptionally good cleaning and wetting agents and are suitable for use in various industries where it is desirable to have a substance which produces a low surface tension effect or which has a high surface activity. The products may be used in the making of soaps for various purposes and for blending with various oily products to make lubricants and other compositions. Numerous other uses may be made of the sulphonated products such as those produced in accordance with the foregoing examples, as shown by the second column, page 3, of Patent No. 2,061,618.

From the foregoing description of the invention taken in connection with the prior art, it is apparent that various modifications may be made in the procedure and in the purification of the sulphonic acids and salts produced. While reference has been made particularly to the use of strong sodium hydroxide for neutralizing the sulphonic acid product, it is obvious of course that other alkaline neutralizing agents may be used such as referred to in the prior patents.

The use of catalysts in connection with the usual sulphonating agents has been proposed, but after careful investigation it has been found that more satisfactory results were obtained with pyrosulphuryl chloride if no (known) catalyst were employed.

When the process is carried out so that the sulphonating agent is introduced in vapor phase, in dry air for example, better results and easier control are obtained, particularly when sulphonating the compounds of higher molecular weight. A liquid phase operation gives good results with compounds of lower molecular weight. The low temperatures (minus 10 to minus 20° F.) must be maintained, and the agent may be diluted when the vapor phase is used. Sulphur trioxide may be used in any of the examples as the sulphonating agent where a chlorinated solvent is used provided it, when diluted with the solvent, is maintained at a temperature below zero or minus 10° F. These low temperatures not only prevent formation of phosgene but in all of the operations no organic chlorides are obtained. Sulphur trioxide at higher temperatures either causes chlorination as well as polymerization or other reactions which indicate this effect.

Having thus described the invention in its preferred form, what is claimed as new is:

1. In the sulphonation of a compound of the group consisting of dipentene, the diamylenes, turpentine, alpha and beta pinenes, pine oil, abietic acid, methyl abietate, and dihydromethyl abietate, the improvement which comprises carrying out the sulphonation with pyrosulphuryl chloride at a temperature below about minus ten degrees F.

2. In the process of manufacturing sulphonated organic compounds adapted to lower the surface tension of liquids, the improvement which comprises intimately mixing a compound of the group consisting of dipentenes, the diamylenes, turpentine, alpha and beta pinenes, pine oil, abietic acid, methylabietate, and dihydromethyl abietate with pyrosulphuryl chloride at a relatively low temperature particularly adapted for the sulphonation of the compound to be sulphonated, and effecting the sulphonation reaction in the absence of a sulphonation catalyst at a temperature of from approximately minus 10° to minus 20° F.

3. In the process of sulphonating relatively high boiling point organic compounds, the improvement which comprises dissolving an organic compound of the group consisting of dipentene, the diamylenes, turpentine, alpha and beta pinenes, pine oil, abietic acid, methyl abietate and dihydromethyl abietate in a substantial proportion of carbon tetrachloride as a solvent, dissolving a predetermined proportion of pyrosulphuryl chloride in a substantial proportion of carbon tetrachloride, and slowly adding the diluted pyrosulphuryl chloride to the diluted organic compound in a reaction vessel while maintaining the temperature of the contents of the reaction vessel below approximately minus 15° F., and intimately mixing the pyrosulphuryl chloride with the organic compound mixture as fast as the pyrosulphuryl chloride is introduced into the reaction vessel.

4. In the process of sulphonating relatively high boiling unsaturated hydrocarbon compounds and their unsaturated derivatives for the production of sulphonates adapted to reduce the surface tension of liquids, the improvement which comprises slowly mixing a predetermined proportion of a compound selected from the group consisting of dipentene, the diamylenes, turpentine, alpha and beta pinenes, pine oil, abietic acid, methyl abietate and dihydromethyl abietate, and a predetermined proportion of pyrosulphuryl chloride as a sulphonating agent, and maintaining the resulting mixture at a temperature below minus 10° F., during the sulphonating reaction.

5. In the process of sulphonating organic compounds adapted to lower the surface tension of liquids, the improvement which comprises diluting a compound of the group consisting of dipentene, the diamylenes, turpentine, alpha and beta pinenes, pine oil, abietic acid, methyl abietate and dihydromethyl abietate, with a substantial proportion of an anhydrous solvent, slowly adding to the resulting solution a predetermined proportion of pyrosulphuryl chloride sufficient to sulphonate said organic compound, and maintaining the resulting reaction mixture at a temperature of from approximately minus 10° F. to minus 20° F. while effecting the sulphonation reaction.

JACK H. CROMWELL.
SYLVAN R. MERLEY.